United States Patent Office 2,791,099
Patented May 7, 1957

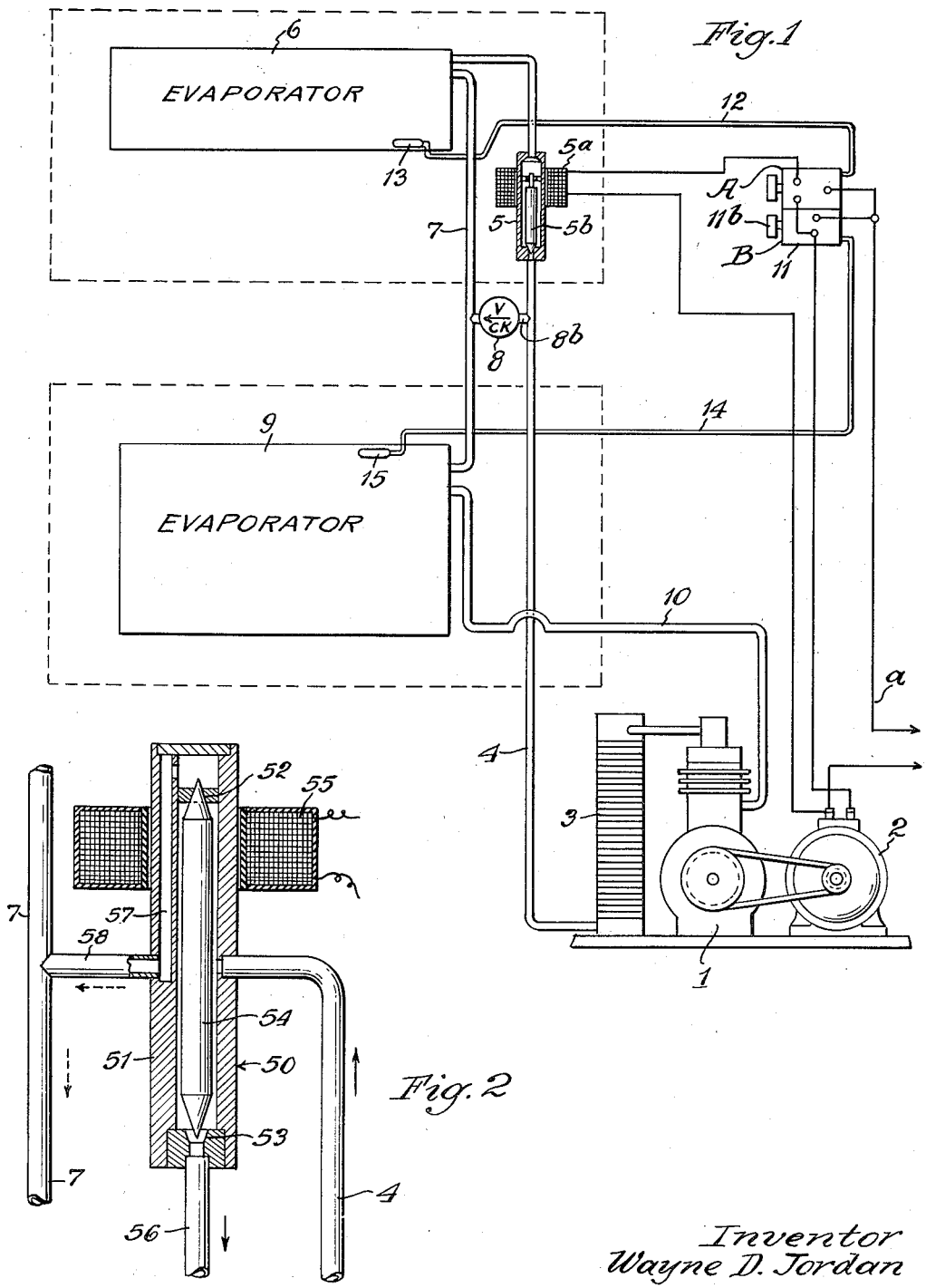

2,791,099
CONTROL SYSTEM FOR MULTI-TEMPERATURE REFRIGERATORS

Wayne D. Jordan, Chicago, Ill.

Application February 27, 1953, Serial No. 339,342

3 Claims. (Cl. 62—4)

My invention relates to an improvement in controls and control systems for multi-temperature refrigerators.

One of the faults of most two-temperature household refrigerators having a warmer compartment for storage of unfrozen food and a colder compartment for storage of frozen food, is the wide fluctuations of the temperature in the colder compartment with variations in room temperature. Since proper preservation of frozen food and ice cream requires that the temperature be substantially constant, or be uniform within very close limits (preferably about 0° F.), the wide fluctuations heretofore mentioned result in rapid deterioration of the quality and flavor of the frozen food and ice cream. The reason for those wide fluctuations in temperature is the difference in the ratio of heat gain through insulation into the freezer and the food compartment at various room temperatures. I list typical differences as follows:

| Room Temperature, degrees | Food Compartment, degrees | Freezer Compartment, degrees | Heat Gain Ratio |
|---|---|---|---|
| 100 | 40 | 0 | 1.67:1 |
| 80 | 40 | 0 | 2:1 |
| 70 | 40 | 0 | 2.33:1 |
| 60 | 40 | 0 | 3:1 |
| 50 | 40 | 0 | 5:1 |

On most such refrigerators, the control which starts and stops the compressor is responsive only to the temperature in the warmer compartment, it being necessary to control from that compartment to avoid freezing milk and other foods stored therein. Thus the refrigerator may hold fairly uniform temperatures in its warmer compartment, but the temperatures in the freezer compartment will vary in accordance with the variations in ratio of heat gain into the two compartments as shown in the table above. Thus, if the owner should keep the box in an unheated pantry or enclosed porch, as in the South or in California, and the room temperature drops to 50° F., theoretically the freezer compartment temperatures will rise to 33° F. If the room temperature should drop to 40° F., the compressor will not run at all and the freezer compartment temperature will rise to 40° F., resulting in the loss of the frozen food.

Another fault of many two-temperature refrigerators is that they employ electric heaters or hot gas to defrost the evaporators at regular intervals, usually once or twice a day. Some have 800-watt heaters attached to the evaporators, the heaters being turned on for periods of 10 to 15 minutes to melt the frost. Since the frozen food is stored on or in proximity to the evaporator surface, the heating of the evaporator surface to 32° F. for defrosting results in warming up the frozen food and ice cream adjacent the evaporator.

Another fault of some of the two-temperature refrigerators having two doors, one over each of the compartments, and with the temperature control responsive only to the temperature in the warmer compartment, is that frequent opening of the door over the freezer compartment to remove ice cubes or frozen food, will spill out the cold air, which is replaced with warm air from the room. This results in a rapid rise in temperature in the freezer compartment. Repeated openings to remove ice cubes can cause the temperature in the freezer compartment to rise to 32° F. Yet the compressor will run only often enough and long enough to maintain the temperature in the warmer compartment. This will be infrequent and only for very short periods in a 70° F. kitchen. Under such conditions, the frozen food and ice cream may actually defrost.

It is a primary purpose of my invention to avoid all of the undesirable conditions heretofore enumerated.

One purpose is to provide positive, separate temperature control in each of the compartments in order that predetermined temperatures of say 40° F. and 0° F. may be maintained, regardless of room temperature.

Another purpose is to provide positive, automatic defrosting of the evaporator in the warmer compartment without the use of electric heaters or hot gas, and without any "hot defrost" periods to raise the temperature in either compartment.

Another purpose is to insure that the compressor will start whenever refrigeration is required in either compartment, and will continue to operate until the refrigeration requirements are satisfied, thereby insuring that neither compartment can warm up without starting the compressor.

I accomplish all of the foregoing purposes with a refrigerant control means in combination with dual thermal control means, as hereinafter described.

I illustrate my invention more or less diagrammatically with the accompanying drawings, wherein Figure 1 is a diagrammatic or schematic view of a control system for multi-temperature refrigerators in which my invention is included and;

Figure 2 is a partial diagrammatic or schematic showing of my system with the inclusion of a variant control valve arrangement.

Referring to the drawings and first to Figure 1, I diagrammatically illustrate any suitable compressor 1 having a motor 2 and a condenser 3. 4 indicates a suitable refrigerant duct adapted to supply refrigerant under pressure to the below-described evaporators. 5 indicates a valve, illustratively shown as a solenoid valve, adapted under certain conditions to cut off the supply of refrigerant to the evaporator 6, to which the passage 4 normally delivers. 7 illustrates a refrigerant duct extending from the evaporator 6 to the evaporator 9. If it be assumed that the valve 5 is open, then the liquid refrigerant under pressure will be delivered along the duct 4 to the evaporator 6 and will flow thence through the duct 7 to the evaporator 9. 10 is the refrigerant return duct from the evaporator 9 to the suction or intake side of the compressor 1.

I illustrate in Figure 1 a simple and efficient control means responsive to the temperature in either compartment. The dual thermal control 11, when thermally and electrically connected as shown in Figure 1, is responsive to the temperature in either compartment. I indicate at 12 a thermal control capillary from the upper control section A. The capillary 12 extends to the capillary bulb 13 shown as in heat transfer contact or relationship with the evaporator 6 of one compartment. 14 indicates a second thermal control capillary which extends from the control section B to the capillary bulb 15 which is in heat transfer contact or relationship with the evaporator 9 of the other compartment.

In operation, when refrigeration is required in the compartment in which the evaporator 6 is located, the set of contacts in the control section A, in the control 11, closes in suitable response to the capillary system 12, 13. As will be clear from Figure 1, electric current from the hot wire "a" simultaneously starts the motor 2 and opens the solenoid valve by energizing the coil 5a and moving the valve element or needle 5b which may normally be kept by gravity or by other means in the closed position. The refrigerant then flows through the open valve 5 to and through the evaporator 6, and then flows through the duct 7 to and through the evaporator 9 in the other compartment and thence returns through the duct 10, to the suction side of the compressor 1. When the compartment in which the evaporator 6 is located cools to a predetermined temperature, the contact in the section A of the control assembly 11 will be opened in response to the capillary system 12, 13. This will deenergize the solenoid coil 5a and will permit the valve element 5b to close, for example, by gravity. At the same time, unless the other compartment in which the evaporator 9 is positioned is calling for refrigeration, the compressor will also be stopped, since the motor 2 will be de-energized.

In the event that the compartment in which the evaporator 9 is located is calling for refrigeration when the valve 5 is closed, the control contact of section B of the control 11 will be closed by action of the capillary system 14, 15. In that event, since the valve 5 is closed and since refrigerant is thus prevented from flowing into the evaporator 6, the refrigerant will flow through the valve 8, into the duct 7 to and through the evaporator 9 and back to the suction side of the compressor through the duct 10. For the valve 8 I require a valve element or assembly which is normally closed and will stay closed, as long as the valve 5 is open, but which will open when the valve 5 is closed. I may, for example, employ a spring or gravity loaded check valve with sufficient pressure to slightly more than offset the refrigerant pressure drop through the valve 5 and the evaporator 6. Thus, no refrigerant will pass through the valve 8 as long as the valve 5 is open. The valve 8 is connected by the ducts 8b with the refrigerant ducts 4 and 7, respectively. It thus forms a bypass through which refrigerant will be supplied to the evaporator 9 whenever the valve 5 is closed at a time when the refrigerant is being called for by the compartment in which the evaporator 9 is located.

This arrangement enforces positive control of the temperature in both refrigerated compartments. This positive control is always effective, since the dual control element or assembly 11 will start the compressor whenever refrigeration is required in either compartment and the compressor will continue to operate until the refrigeration requirements are satisfied. When the valve 5 is open in response to the contacts of section A of the control 11, both compartments are refrigerated. With the evaporator 6 positioned in the warmer compartment, it will absorb heat more rapidly than the evaporator 9, because of the higher temperature differential between the refrigerant and the air temperature in the warmer compartment. On an average that differential may be of the order of 40° air temperature and 6° refrigerant temperature, or a differential of 34° F., whereas the differentiation of the colder compartment may be of the order of 2° air temperature and —4° refrigerant temperature, or a differential of 6° F. Thus, the air temperature in the warmer compartment will come down to the predetermined temperature of the control setting first. Then the valve 5 will close and the refrigerant will bypass to the evaporator 9 through the valve 8. Because of the reduced total evaporator surface when the evaporator 6 is cut out, the refrigerant temperature drops immediately to —10 or —12° F. and the temperature in the colder compartment is quickly reduced to zero and to any other predetermined setting of the lower adjusting dial 11b of the control assembly 11. A corresponding dial is provided for the other section of the control assembly.

Because of the pressure drop of the refrigerant as it passes through the evaporator 6 and the duct 7 the evaporator 6 operates at approximately 10° F. higher refrigerant temperature than evaporator 9. Hence when the evaporator 6 is operating at 6° F. during a normal cycle, the evaporator 9 will be at —4° F., which is low enough to prevent the colder compartment from warming up but which is not low enough to pull it down to its cut-out point. Because of that inherent characteristic, the warmer evaporator and compartment always come down to temperature first, after which the colder compartment is pulled down quickly because of the drop in refrigerant temperature.

I illustrate in Figure 2 an alternative or varient design of refrigerant control means or valve. The valve 50 constitutes a two-way valve, performing the functions both of the valves 5 and 8 of Figure 1. I illustrate, for example, a valve housing 51 having an upper valve seat 52 and a lower valve seat 53. 54 indicates a valve element which is illustratively shown as normally gravitally seated against the seat 53. 55 illustrates a solenoid coil mounted on and readily removable from the valve house 51. When energized it draws the valve member 54 upwardly against the seat 52. Thus, with the refrigerant delivered to the valve assembly 50 through the duct 4, it will flow through the seat 53 when the solenoid coil 55 is energized, as illustrated in Figure 2, and will flow through the seat 52 when the solenoid coil is de-energized. 56 indicates a passage extending to the evaporator 6. When the solenoid coil 55 is energized the refrigerant supplied along the duct 4 thus travels first to the evaporator 6 and then to the evaporator 9. When the solenoid coil 55 is de-energized, the refrigerant passes through the seat 52 through the bypass passage 57, to the bypass connection 58 and thus to the duct 7, along which the refrigerant then flows to the evaporator 9. Thus, with the valve member 54 in its upper position, refrigerant flows through the evaporators 6 and 9 in series. With the valve element in its lower position, refrigerant flows only through the evaporator 9, bypassing the evaporator 6.

It will be realized that whereas I have described and shown a practical and operative system, and two variations of it, nevertheless various other means or structures can be used to accomplish my refrigerant control. I therefore wish my description and drawings to be taken as in a broad sense illustrative or diagrammatic, rather than as limiting me to my specific showing herein. For example, a snap action thermal valve can be used in place of solenoid valve 5. It will accomplish the purpose of shutting off the supply of the refrigerant to one evaporator while allowing it to continue to flow to the other. The dual control 11 may be constructed in a wide variety of forms, the essential being that a control is employed which will start the motor in response to the need for refrigeration in either compartment, and which includes means for actuating the refrigerant control means.

Broadly, I illustrate herein two compartments, one being a warmer compartment and the other being a colder compartment with a refrigerant evaporator in each compartment. Since the details of the compartments do not of themselves form part of the invention, I have illustrated compartment walls in dotted lines merely diagrammatically in the drawings. The compressor condenser unit is shown as located exterior to the compartments and the refrigerant control means above described control the operation of the compressor in response to the need for refrigeration in either of the compartments.

I claim:

1. In a refrigerator having the refrigerated space divided into a warmer compartment and a colder compartment, refrigerating means including an evaporator in said warmer compartment and an evaporator in said colder compartment, said means including a compressor unit located externally of the refrigerated space, refrigerant tubing for delivering refrigerant from the compressor unit to the inlet side of said warmer compartment evaporator, refrigerant tubing for returning refrigerant from said colder compartment evaporator to said compressor unit, a compressor actuating switch responsive to the temperature in said warmer compartment and a second compressor actuating switch responsive to the temperature in said colder compartment, actuation of either one or both of said switches in response to predetermined rises of the temperature in their associated compartments being effective to operate said compressor unit so as to deliver refrigerant to said first named tubing, a tubing connection for delivering refrigerant from the said warm compartment evaporator to the inlet side of said cold compartment evaporator when said first named switch is actuated and independent of actuation of said second named switch, a bypass tubing connection between said first named tubing and the inlet side of said cold compartment evaporator, a valve in the refrigerant tubing leading to said warm compartment evaporator and between said bypass tubing connection and said warm compartment evaporator whereby closure of said valve prevents flow of refrigerant to said warm compartment evaporator while permitting flow of refrigerant to said cold compartment evaporator, valve operating means for opening said valve when said first named switch is actuated, and for closing said valve when said first named switch is deactuated, whereby refrigerant is delivered from said compressor directly to said colder compartment evaporator while bypassing said warmer compartment in response to a predetermined lowering of the temperature in said warmer compartment and refrigerant is circulated through said evaporators in series when said first named switch is actuated.

2. The structure of claim 1 wherein said valve operating means includes a solenoid and means for energizing the coil of the solenoid in response to predetermined temperature conditions in said warmer compartment.

3. The structure of claim 1 wherein said valve operating means includes a solenoid energized when said first named compressor actuating switch is de-energized.

References Cited in the file of this patent
UNITED STATES PATENTS

| | | |
|---|---|---|
| 2,038,434 | Lipman | Apr. 21, 1936 |
| 2,133,964 | Buchanan | Oct. 25, 1938 |
| 2,462,240 | Van Vliet | Feb. 22, 1949 |
| 2,462,279 | Passman | Feb. 22, 1949 |
| 2,471,137 | Atchison | May 24, 1949 |
| 2,604,761 | Atchison | July 29, 1952 |
| 2,622,405 | Grimshaw | Dec. 23, 1952 |
| 2,633,003 | Jordan | Mar. 31, 1953 |